Patented July 22, 1952

2,604,413

UNITED STATES PATENT OFFICE 2,604,413

ETHYL CELLULOSE COMPOSITION CONTAINING DI-TERTIARY-OCTYL DIPHENYLOXIDE

Earle L. Kropscott and Paul H. Lipke, Jr., Midland, Mich., assignors to The Dow Chemical Company, Midland, Mich., a corporation of Delaware No Drawing. Application June 4, 1947,
Serial No. 752,565

6 Claims. (Cl. 106—188)

The present invention relates to specific compositions of ethyl cellulose, plasticized with di-tertiary-octyl diphenyloxide, having a unique combination of properties which makes the compositions especially valuable for use in extrusion or in compression or injection molding operations.

It is common experience that a plasticizer may contribute one or two desirable properties to a thermoplastic material and at the same time may exert an undesirable influence on other properties. Thus, if a plasticizer improves the flexibility, or if it increases the potential elongation of articles made of a particular plastic, it is commonly found to depress the yield point to undesirably low values. If a plasticizer materially reduces the temperature at which the plastic composition may be molded or extruded, the resulting articles are often too soft. If a modifier is found to impart desirable electrical insulating properties to a plastic composition it is often necessary to find additional modifiers to adjust the hardness, or the softening point, or the water-absorption properties of the composition. Hence, plasticizers are most often used for specific effect on one or two properties of interest in a particular use for the composition, and differently modified compositions are required whenever emphasis in use is placed upon some other property. While various plastic compositions are sold as "general purpose" plastics, these are usually characterized by a combination of barely acceptable values for many properties and by outstanding values for none of them.

It is an object of this invention to provide an ethyl cellulose plastic composition suitable for use in extrusion and molding operations at moderate temperatures and pressures, which composition has the following unique combination of properties: rapidly hardens after a shaping operation, to form strong articles capable of greater elongation, having greater hardness and impact strength and lower water absorption than the usual "general purpose" and "low temperature" types of ethyl cellulose plastics, and at least as good dielectric properties as the ethyl cellulose compositions specifically recommended for dielectric uses. A particular object is to provide an ethyl cellulose composition especially adapted for use in electrical insulation, and having improved hardness and impact strength, and lower water absorption values than ethyl cellulose compositions heretofore known and recommended for such use. A more general object is the provision of a plasticized ethyl cellulose composition suitable for use in films, lacquers, and other coatings as well as in molding and extrusion operations. Other and related objects may become apparent from the following description of the invention.

It has now been found that an ethyl cellulose composition may be prepared, having all of the desired properties enumerated above, comprising, as the essential ingredients, a molding or film-forming grade of ethyl cellulose (usually about 45 to 48.5 per cent ethoxyl, though somewhat more highly etherified ethyl cellulose may be used) and di-tertiary-octyl diphenyloxide, the latter being present in amounts from 2 to 30 per cent of the combined weight of ethyl cellulose and plasticizer. For molding and extrusion purposes the ethyl cellulose will usually have an ethoxyl content of 45 to 47.5 per cent and the amount of plasticizer will vary from 5 to 20 per cent.

The di-tertiary-octyl diphenyloxide may be prepared by a condensation of di-isobutylene with diphenyloxide (phenyl ether) in the presence of a Friedel-Crafts catalyst such as aluminum chloride, and fractional distillation of the resulting product. The compound, or mixture of isomeric compounds, here employed as a plasticizer, boils at 210°–215° C. at 3 millimeters of mercury, absolute pressure. It has a density of 0.944 to 0.952 at 20° to 25° C., a refractive index of about 1.525 at 25° C. referred to the D line of sodium, and a viscosity of the general order of 5,000 to 7,000 centistokes at 25° C. and about 40 centistokes at 80° C. When carefully distilled, it is a colorless liquid, but may carry a slight yellow coloration as commercially produced.

Typical plastic formulations comprising ethyl cellulose and di-tertiary-octyl diphenyloxide, in proportions particularly adapted for three typical fabrication operations, are:

|  | I | II | III |
|---|---|---|---|
| Ethyl cellulose: | | | |
|   46% ethoxyl, 75 centipoises | 83 | 94 | |
|   47.5% ethoxyl, 100 centipoises | | | 75 |
| Di-tertiary-octyl diphenyloxide | 16 | 5 | 14 |
| Pentaerythritol ester of rosin ("Pentalyn") | | | 10 |
| Pigment | 1 | 1 | 1 |
|     Total | 100 | 100 | 100 |

Formula I represents a composition for general purpose molding and extrusion uses, and is especially desirable for injection molding. Formula II gives extruded articles of high rigidity having high resistance to thermal distortion (high "heat distortion" test). Formula III represents a composition useful in compression molding and other low pressure forming operations.

To illustrate the advantages of the new compositions, moldings of the one designated above as Formula I will be compared as to many significant properties with moldings of older commercial ethyl cellulose compositions specifically designated for particular uses. One of the comparative formulations is known as an electrical grade, because of its dielectric properties and low water absorption values. Another is unusual because molded and extruded articles therefrom have good flexibility and high impact strength at low temperatures. The third is a commercial "general purpose" molding and extrusion composition. The comparison of properties of these various molded compositions appears in the following table.

makes possible shorter than usual molding cycles, because the molded articles may be ejected from the die after a shorter cooling period than required with many ethyl cellulose molding compositions. It is noted, as an additional advantage in fabrication, that the new compositions require no mold-release agents, and that they form highly glossy molded articles, both of which traits are rare in ethyl cellulose molded articles.

The plasticizer here concerned is soluble in all common lacquer solvents used with ethyl cellulose, and it may be used to plasticize ethyl cellulose films and lacquer coatings. Such films retain surprisingly high strength values, compared with the unmodified films, but have much lower softening and melting points than the unplasticized film. It is this same combination of low softening point and high retention of hardness and strength which makes the new compositions so useful in making molded and extruded articles, as described above. The following table illustrates the effect of di-tertiary-octyl diphenyloxide on the strength and the softening point of ethyl cellulose film.

|  | Formula I | Electrical | Low Temperature | General Purpose |
|---|---|---|---|---|
| Ethyl cellulose, 46% ethoxyl, 75 centipoises | 83 | 81 | 81 | 81 |
| Plasticizer: | | | | |
| Di-tertiary-octyl diphenyloxide | 16 | | | |
| Liquid polymer of alpha-methyl styrene (molecular weight 300–600) | | 10 | | |
| Mono-phenyl di-(ortho-xenyl) phosphate | | | | 16 |
| 2-ethyl-hexyl ester of 12-hydroxy stearic acid | | | 18 | |
| Methyl ester of 12-hydroxy stearic acid | | | | 2 |
| Refined mineral oil | | 8 | | |
| Pigment | 1 | 1 | 1 | 1 |
| Tensile strength, pounds per square inch | 4,500 | 5,000 | 4,300 | 3,800 |
| Elongation, per cent | 14 | 10 | 8.5 | 10 |
| Rockwell superficial hardness, M (¼ in. ball, 10 kg.-100 kg.) | 75 | 70 | 50 | 65 |
| Impact strength, foot pounds per inch: | | | | |
| At 21° C., notched | 3.2 | 2.0 | 3.5 | 2.4 |
| At 21° C., unnotched | 24.0 | 14.0 | 20.0 | 14.0 |
| At −18° C., notched | 1.4 | 0.8 | 1.5 | 1.0 |
| At −18° C., unnotched | 8.0 | 5.0 | 10.0 | 5.0 |
| Water absorption, per cent gain after 24 hours, immersion | 0.9 | 1.1 | 1.6 | 1.3 |
| Dielectric constant: | | | | |
| 1,000 cycles | 3.4 | 3.4 | 3.95 | 4.2 |
| 1,000,000 cycles | 3.2 | 3.2 | 3.5 | 3.6 |
| Per cent power factor: | | | | |
| 1,000 cycles | 0.70 | 0.67 | 0.66 | 1.68 |
| 1,000,000 cycles | 1.19 | 1.80 | 2.48 | 3.90 |

Thus, it is seen that the composition of Formula I, typifying the present invention, is superior in all respects to the usual type of "general purpose" molding and extrusion composition, and is at the same time equivalent in critical properties to compositions specifically designed for dielectric uses or for use where low temperatures are to be encountered. Formula I gives moldings having lower water absorption values than any of the comparative compositions.

The new plastic compositions offer advantages, not only in the properties of articles fabricated therefrom, as in the foregoing table, but also in ease of handling during the fabrication. This is due to the fact that di-tertiary-octyl diphenyloxide greatly reduces the softening, and hence the extrusion or molding, temperature of ethyl cellulose compositions without unduly softening the finished article. This combination of properties makes it possible, for example, to extrude the new compositions in shapes of irregular cross-section without the need for complex equipment to support and carry the extruded material away from the orifice until thoroughly cold. It also

|  | (a) | (b) | (c) |
|---|---|---|---|
| Ethyl cellulose 46% ethoxyl, 50 centipoises [1] | 100 | 87 | 71 |
| Di-tertiary-octyl diphenyloxide | | 13 | 29 |
| Tensile strength, kilograms per square centimeter | 611 | 572 | 506 |
| Yield point, kilograms per square centimeter | 458 | 479 | 409 |
| Elongation, percent | 27 | 26 | 29 |
| Softening point, °C | 145 | 116 | 97 |
| Melting point, °C | 170 | 157 | 152 |

[1] Wherever reference is made herein to the viscosity rating of ethyl cellulose, in centipoises, the determination has been made on a 5 percent solution thereof, by weight, in a 70:30 mixture of toluene and ethanol, by volume.

This invention is limited to di-tertiary-octyl diphenyloxide as the principal modifier in ethyl cellulose compositions because mono-tertiary-octyl diphenyloxide is too volatile and does not contribute the desired properties to ethyl cellulose compositions containing it, and tri-tertiary-octyl diphenyloxide is too viscous for general use, and, while it has specific utility, does not provide compositions having the general utility provided by the di-octyl compound.

The invention is limited to ethyl cellulose compositions, because di-tertiary-octyl diphenyloxide, while giving the appearance of compatibility in solutions of some other plastics, is incompatible, or nearly so, in films and molded articles made of such typical plastics as cellulose acetate, cellulose nitrate, cellulose acetate butyrate, cellulose acetate propionate, polyvinyl butyral, vinyl chloride-vinyl acetate copolymer, polyethylene, polyvinyl chloride, and vinylidene chloride copolymers with vinyl chloride or with acrylonitrile.

We claim:

1. A composition of matter consisting essentially of ethyl cellulose and a plasticizing concentration of di-tertiary-octyl diphenyloxide boiling at 210° to 215° C. at 3 millimeters of mercury, absolute pressure.

2. A composition of matter consisting essentially of ethyl cellulose of at least about 45 per cent ethoxyl content and from about 2 to about 30 per cent of its combined weight therewith of di-tertiary-octyl diphenyloxide boiling at 210° to 215° C. at 3 millimeters of mercury, absolute pressure.

3. A plastic composition consisting essentially of ethyl cellulose having an ethoxyl content of from about 45 to about 47.5 per cent, and from about 5 to about 20 per cent of its combined weight therewith of di-tertiary-octyl diphenyloxide boiling at 210° to 215° C. at 3 millimeters of mercury, absolute pressure.

4. A plastic composition consisting essentially of about 83 parts by weight of a molding grade of ethyl cellulose and about 16 parts by weight of di-tertiary-octyl diphenyloxide boiling at 210° to 215° C. at 3 millimeters of mercury, absolute pressure.

5. A plastic composition consisting essentially of about 94 parts by weight of a grade of ethyl cellulose suitable for extrusion and about 5 parts by weight of di-tertiary-octyl diphenyloxide boiling at 210° to 215° C. at 3 millimeters of mercury, absolute pressure.

6. A film-forming composition consisting essentially of a grade of ethyl cellulose suitable for use in coatings and from about 2 to about 30 per cent of its combined weight therewith of di-tertiary-octyl diphenyloxide boiling at 210° to 215° C. at 3 millimeters of mercury, absolute pressure.

EARLE L. KROPSCOTT.
PAUL H. LIPKE, Jr.

REFERENCES CITED

The following references are of record in the file of this patent:

UNITED STATES PATENTS

| Number | Name | Date |
|---|---|---|
| 2,109,514 | Van Duzee et al. | Mar. 1, 1938 |
| 2,121,723 | Bass et al. | June 21, 1938 |
| 2,170,809 | Coleman et al. | Aug. 19, 1939 |

OTHER REFERENCES

"Ethyl Cellulose," Hercules Powder Co. (1944), page 15.